J. Battin.

Sheet 1, 2 Sheets.

Coal Breaker.

No. 142.

Reissued Sept. 4, 1849.

Sheet 2, 2 Sheets.

J. Battin.

Coal Breaker.

No. 142.

Reissued Sept. 4, 1849.

BEST AVAILABLE COPY

UNITED STATES PATENT OFFICE.

JOSEPH BATTIN, OF PHILADELPHIA, PENNSYLVANIA.

MACHINE FOR BREAKING COAL.

Specification forming part of Letters Patent No. 3,292, dated October 6, 1843; Reissue No. 142, dated September 4, 1849.

*To all whom it may concern:*

Be it known that I, JOSEPH BATTIN, of the city and county of Philadelphia, and State of Pennsylvania, have invented new and useful Improvements in the Machine for Breaking and Screening Coal, particularly anthracite; and I do hereby declare that the following is a full, clear, and exact description of the principle or character which distinguishes them from all other things before known, and of the manner of making, constructing, and using the same, reference being had to the accompanying drawings, making part of this specification, in which—

Figure 1:
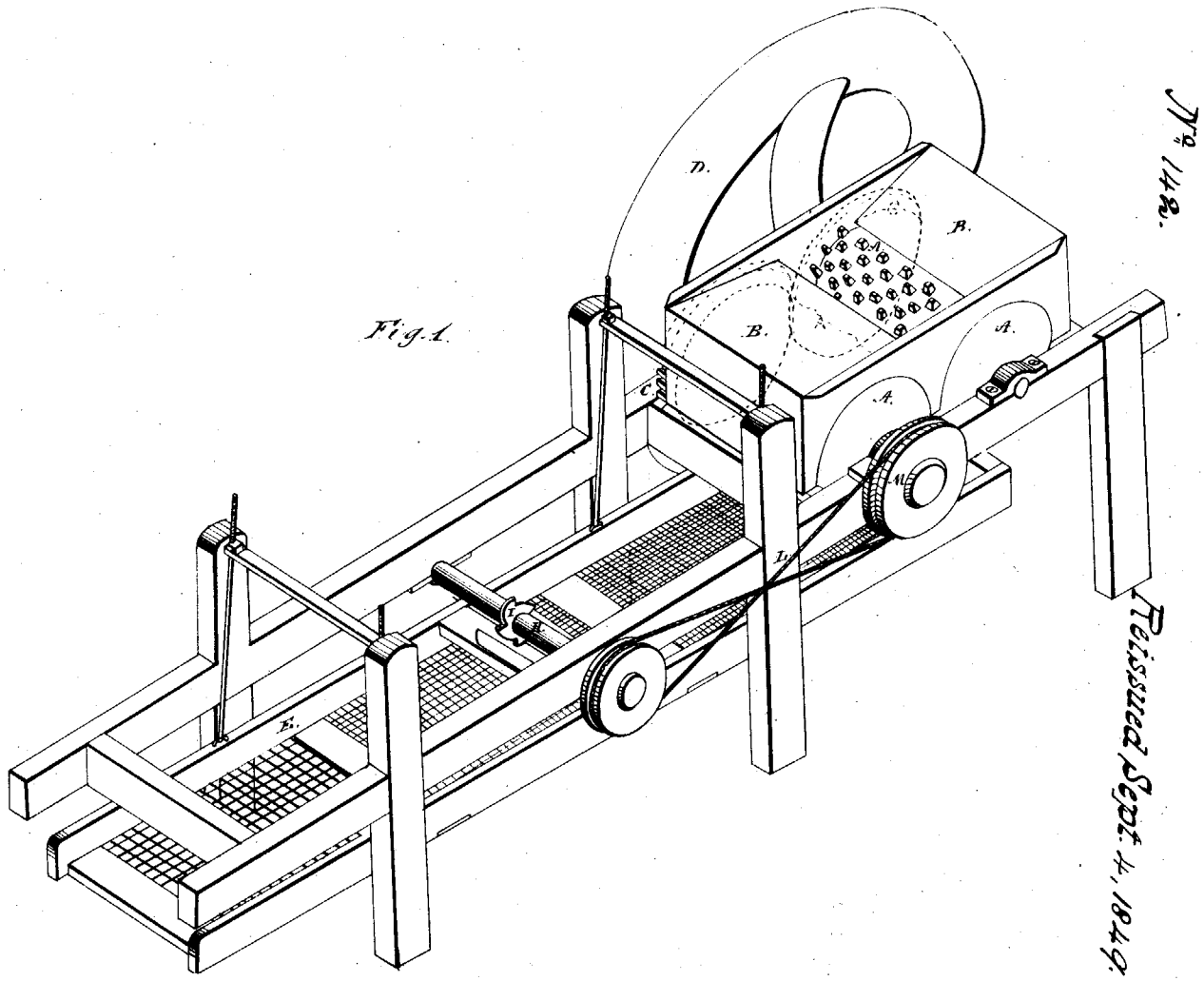
Figure 2:
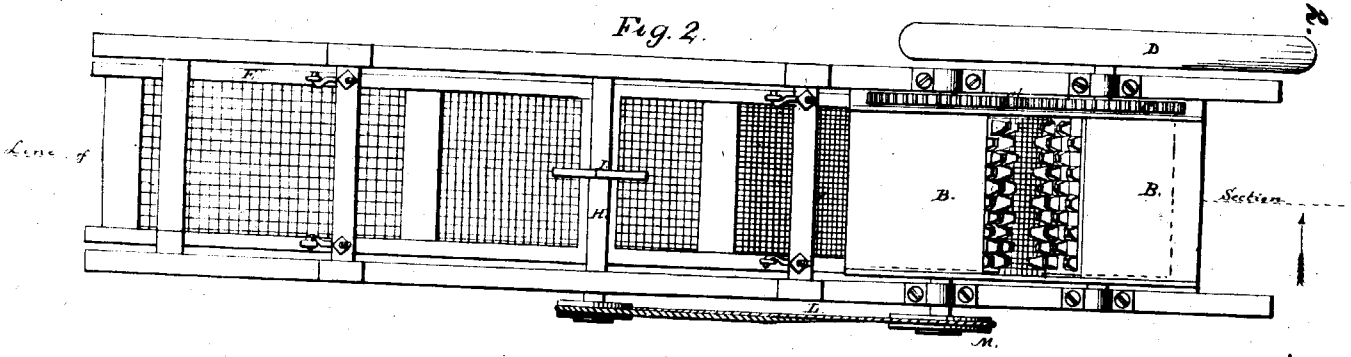
Figure 3:
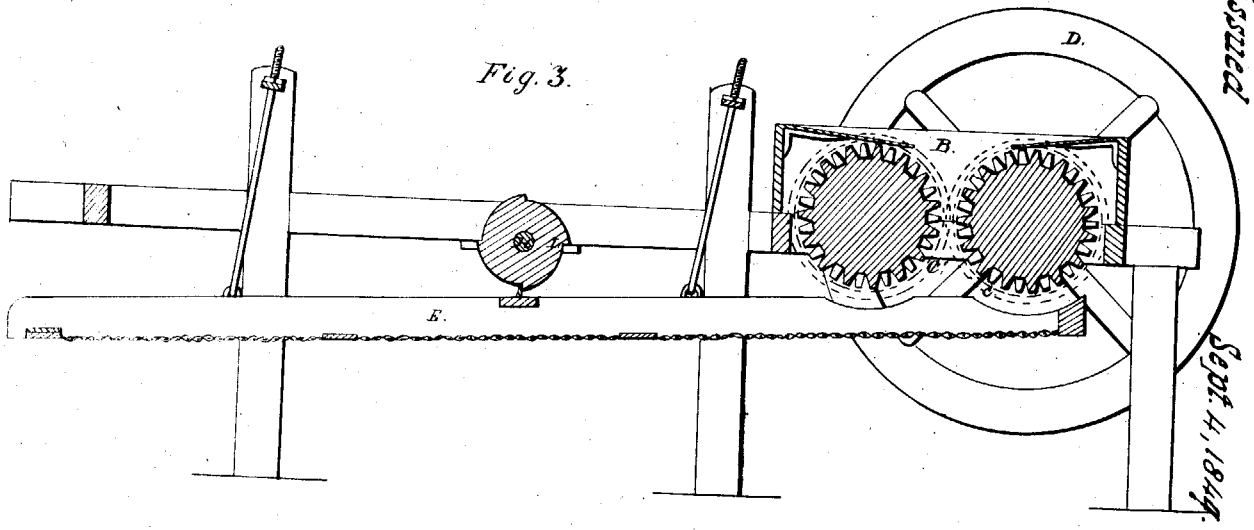

Figure 1 is a perspective view of the machine, and Fig. 2 is a plan and Fig. 3 a section.

The same letters indicate like parts in all the figures.

Anthracite coal, as taken from the mines, is generally in large lumps, which, for general consumption, require to be reduced into small lumps, the regularity in the size of the lumps being desirable, not only for convenience but for economy in burning, as the more regular the size of the lumps when of the size adapted to the grate the better the combustion.

Anthracite coal, for which the machine is chiefly intended, is very frangible, and when broken the fracture is irregular. If broken by percussion, the strength of the blow must not be great, or the whole will be reduced to powder, and if broken by pressure the moment the required separation has been effected the pressure must be withdrawn, or the mass will be pulverized.

The machines for crushing iron ore and stones, and grinding and crushing other substances used prior to my invention, when applied to the breaking of anthracite coal occasion waste by pulverization, and are not adapted to the peculiar nature of this material.

The object of my invention is to break this kind of coal in lumps of an approximately regular size and with little waste; and to these ends the principle or character of my invention for breaking coal into small lumps, and that which distinguishes it from all other machines before known for this or any analogous purpose, consists in combining together two rollers, the shafts of which are geared together to cause them to rotate in opposite directions with positive and equal motions when the peripheries of the said rollers are provided with teeth or projections so disposed or arranged that the teeth or projections on the one shall in the rotation come opposite the spaces between the teeth or projections of the other, and vice versa, so that as the rollers rotate the teeth or projections on the rollers shall take the large lumps and break them into smaller lumps by making pressure on opposite sides thereof, but at points not coincident, and then by the continued rotation remove the pressure and liberate and discharge the broken pieces so soon as the desired effect has been produced.

The accompanying drawings represent the machine with a frame properly adapted to the purpose, but which may be varied at the pleasure of the constructer, and within the frame are arranged two parallel cast-iron rollers. The peripheries of these rollers are cast or otherwise formed with projections or teeth of a pyramidal form and arranged in rows running in the direction of helices, so that the space between any form contiguous teeth shall be a parallelogram with two of its angles in a line parallel with the axis and the other two at right angles thereto. The shafts of the two rollers are geared together by means of two cog-wheels, C C′, that their peripheries shall rotate in opposite directions and with equal velocities, and their peripheries are placed at about a distance of three inches apart, more or less, according to the average size to which it is desired to break the coal. In this way the points of the teeth of one roller will in the rotation come opposite, and, if desired, enter for a short distance into the spaces between the teeth of the other, and vice versa; but the teeth of the two rollers never come into contact with each other. A hopper, B, may be placed above the space between the two rollers, with the lower aperture sufficient in capacity for the delivery to the rollers of the large lumps of coal as they come from the mine, and when properly broken by pressure between the rollers the products may drop or be received into a screen or sieve, E, which may be inclined from one end to the other, the upper end being so placed below the rollers as to catch all the coal. The surface of the screen should be made into three (more or less) divisions, the meshes of the second division being coarser than those of the first, and so on, increasing toward the lower end, which has the largest meshes. The requisite vibratory motion may be given to the screen by tappets I on a shaft, H, which receives motion by a band, L, from a pulley M, on the shaft of one of the breaking-rollers. By this means as the broken coal falls onto the screen the particles pass through the meshes of the first division, those which are a little larger through the meshes of the second division, and so on to the end, the largest lumps being delivered at the end of the screen into an appropriate receptacle.

By the construction and arrangement of the breaking-rollers it will be perceived that as they rotate the teeth constitute a series of progressive levers, which act on opposite sides of the lumps, and, being placed so as not to coincide, snap or break the lumps between the points of pressure, this pressure gradually increasing until the separation is effected—that is, during the rotation until the teeth reach a plane passing through the axis of the two rollers, and then the effect having been produced the teeth recede to liberate the lumps, and thus avoid the further reduction of the material. This mechanical action of the rotary teeth is thus adapted to the frangible or brittle nature of coal, which is readily pulverized when subjected to a continued percussion or pressing action.

It will be obvious from the foregoing that the form and size of the teeth may be greatly varied, as well as the space between the periphery of the two rollers, without changing the principle or mode of operation of my invention so long as the two rollers are geared together, and the teeth of one are in the rotation made to come opposite to or in the space between the teeth of the other, and vice versa, space sufficient to hold the required size of lumps of coal being left between the teeth of the two rollers when passing a plane which coincides with the axis of the two rollers.

What I claim, therefore, as my invention, and desire to secure by Letters Patent, is—

The arrangement of the teeth on the two rollers, substantially as herein described, so that in their rotation the teeth of one shall come opposite the spaces between the teeth of the other, with sufficient space between to hold lumps of the required size, the rollers being so combined by gearing as to make them rotate in opposite directions and with the required velocities to retain the relative position of the teeth of the two rollers, as described.

JOSEPH BATTIN.

Witnesses:
AMOS K. CARTER,
ALEX. PORTER BROWNE.